US010713212B2

(12) United States Patent
Bruner et al.

(10) Patent No.: US 10,713,212 B2
(45) Date of Patent: Jul. 14, 2020

(54) MOBILE REMOTE DIRECT MEMORY ACCESS

(71) Applicant: Microsoft Technology Licensing, LLC, Redmond, WA (US)

(72) Inventors: John David Bruner, Bellevue, WA (US); David Garfield Thaler, III, Redmond, WA (US)

(73) Assignee: MICROSOFT TECHNOLOGY LICENSING LLC, Redmond, WA (US)

( * ) Notice: Subject to any disclaimer, the term of this patent is extended or adjusted under 35 U.S.C. 154(b) by 115 days.

(21) Appl. No.: 15/992,248

(22) Filed: May 30, 2018

(65) Prior Publication Data

US 2019/0354506 A1 Nov. 21, 2019

Related U.S. Application Data

(60) Provisional application No. 62/674,555, filed on May 21, 2018.

(51) Int. Cl.
*G06F 15/167* (2006.01)
*G06F 15/173* (2006.01)
(Continued)

(52) U.S. Cl.
CPC ....... *G06F 15/17331* (2013.01); *H04W 76/10* (2018.02); *H04W 84/042* (2013.01)

(58) Field of Classification Search
CPC ............ G06F 15/17331; H04W 76/10; H04W 84/042
(Continued)

(56) References Cited

U.S. PATENT DOCUMENTS 8,579,632 B2 11/2013 Crowley
2005/0165746 A1 7/2005 Chakravarty et al.
(Continued)

FOREIGN PATENT DOCUMENTS

EP 2518643 A1 10/2012
EP 2676206 B1 8/2017

OTHER PUBLICATIONS

"International Search Report and Written Opinion Issued in PCT Application No. PCT/US2019/030972", dated Jul. 16, 2019, 10 pages.
(Continued)

*Primary Examiner* — Wing F Chan
*Assistant Examiner* — Joseph R Maniwang
(74) *Attorney, Agent, or Firm* — Mark K. Young; Mayer & Williams PC

(57) ABSTRACT

A mobile local computing device is configured to access memories or storage devices associated with a remote computing device using remote direct memory access (RDMA) over a wireless fifth generation (5G) network link that provides high bandwidth and low latency relative to previous wireless network protocols. The mobile local computing device utilizes a local compute context that is unique to the local environment and which may be facilitated by devices, components, or functionalities that are local to the mobile local computing device, but which are not available with the same context to the remote computing device. The 5G network link supports high bandwidth and low latency so that the mobile local computing device can access and utilize the remote data in large datasets in a similar manner to how it would for locally stored data, while still being able to leverage the local I/O and maintain its unique local compute context.

18 Claims, 12 Drawing Sheets

(51) Int. Cl.
*H04W 76/10* (2018.01)
*H04W 84/04* (2009.01)

(58) Field of Classification Search
USPC ........................................... 709/212
See application file for complete search history.

(56) References Cited

U.S. PATENT DOCUMENTS

| | | |
|---|---|---|
| 2005/0177712 A1 | 8/2005 | Kadi |
| 2016/0127850 A1 | 5/2016 | Kao |
| 2016/0212214 A1 | 7/2016 | Rahman et al. |
| 2017/0155717 A1* | 6/2017 | Tamir .................... H04L 45/745 |
| 2018/0147721 A1* | 5/2018 | Griffin ................ A47L 11/4011 |
| 2019/0197396 A1* | 6/2019 | Rajkumar ................ G06N 3/08 |

OTHER PUBLICATIONS

Vybhava, et al., "Introduction to Emotion—Aware Mobile Cloud Computing in 5G Network", in International Journal of Scientific Research and Education, vol. 4, Issue 4, Apr. 2016, pp. 5235-5239.

* cited by examiner

MOBILE REMOTE DIRECT MEMORY ACCESS

CROSS-REFERENCE TO RELATED APPLICATIONS

This application claims benefit and priority to U.S. Provisional Application Ser. No. 62/674,555 filed May 21, 2018, entitled "REMOTE DIRECT DISK ACCESS OVER 5G," the disclosure of which is incorporated herein by reference in its entirety.

BACKGROUND

Remote direct memory access (RDMA) is a direct memory access from the memory of one computing device into that of another computing device without involving the operating system of the other computer. This direct transfer typically permits high-throughput, low-latency data transfers over a network, which is especially useful in performance-critical deployments. When an application performs an RDMA Read or Write request, the application data are delivered directly from a source memory buffer to a destination memory buffer using RDMA-capable network adapters, which do not involve the central processing unit (CPU) (also referred to simply as a processor) or operating system in the transfer. These RDMA transfers reduce latency and enable fast message transfer.

SUMMARY

A mobile local computing device is configured to access memories or storage devices associated with a remote computing device using remote direct memory access (RDMA) over a wireless fifth generation (5G) network link that provides high bandwidth and low latency relative to previous wireless network protocols. The mobile local computing device utilizes a local compute context that is unique to the local environment and which may be facilitated by devices, components, or functionalities that are local to the local computing device, but which are not available with the same context to the remote computing device. For example, a local compute context may be defined by I/O (inputs/outputs) to local sensors, local specialized hardware, local peripheral devices, or by other data or factors that are present in a given local computing environment. The 5G network link supports high bandwidth and low latency so that the mobile local computing device can access and utilize the remote data in large datasets in similar manner to how it would for locally stored data, while still being able to leverage the local I/O and maintain its unique local compute context.

In an illustrative embodiment, a mobile local computing device can utilize specialized hardware in its local compute context such as high-performance video processing hardware that is used in video editing and graphic production environments. The specialized hardware may be expensive or need personnel with particular training to operate, thus the hardware may not necessarily be available outside its local compute context. In such cases, it may be advantageous for data used by the specialized hardware to be accessed from the remote memory rather than attempt to co-locate the hardware with the data. The high bandwidth supported by the 5G network can enable the specialized video hardware to access large amounts of remote data when performing local processing. The low latency of the 5G network enables real time manipulation of the video data which can be particularly beneficial in broadcasting and live streaming applications.

In another illustrative embodiment, a mobile local computing device may access large discrete datasets from the remote memory using RDMA over the 5G network link in stages. Such staged access can enable the computing device to be selectively reconfigured for a given purpose, role, or task. For example, the mobile local computing device can comprise a multi-purpose industrial machine having robotic elements. A discrete dataset can be configured to initialize the machine and then provide programmatic operating instructions and associated data to enable it to perform a given function. Another discrete dataset may be utilized to reprogram and/or reinitialize the machine to repurpose it for a different function. Thus, the multi-purpose industrial machine may access the first discrete dataset to perform "pick and place" for parts in a factory in a first local compute context, and then be subsequently repurposed to perform assembly of parts in a second local compute context using a second discrete dataset. Human-readable operating, service, training, repair, or maintenance information can also be also accessed from the remote memory using RDMA over 5G to accompany each unique configuration of the machine.

RDMA over 5G enables rapid repurposing of the multi-purpose industrial machine by enabling utilization of high bandwidth in real time which can be advantageous as the datasets needed to operate such machines are typically large and machine downtime is typically sought to be minimized. A central repository for the machine configuration datasets and associated human-readable information can also be beneficial. In a manufacturing setting, for example, multiple instances of machines and personnel can access the central repository across the factory floor which can ensure data consistency and integrity as compared to traditional methodologies in which data is stored locally in multiple instances. The low latency of the 5G network may further enable machine configurations to be modified and adjusted in real time which can be advantageous, for example, in highly dynamic scenarios where responsiveness to changing local compute contexts needs to be optimized.

In another illustrative embodiment, a mobile local computing device can be reconfigurable to support a plurality of different users. For example, a disk image that is unique to each user can be stored in a remote memory and accessed to thereby place the local device into a suitable configuration for a given user. The local compute context can thus take individual and groups of users into account. A change in local compute context, such as users being swapped out at a local computing device during a shift change at a factory, can be detected, and an appropriate disk image thereafter accessed to reconfigure the device to match the current user. The same mobile local computing device can be sequentially repurposed using different disk images that are accessed using RDMA over the 5G network as personnel and the local context changes.

In another illustrative embodiment, a mobile local computing device can be configured to support an expert system that uses artificial intelligence during device operations. While the expert system can perform local processing using the local compute context, large training datasets or other data that support the expert system can be accessed from remote memory using RDMA over a 5G network link. Some expert system applications can be more performant when diverse training data can be quickly and reliably accessed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
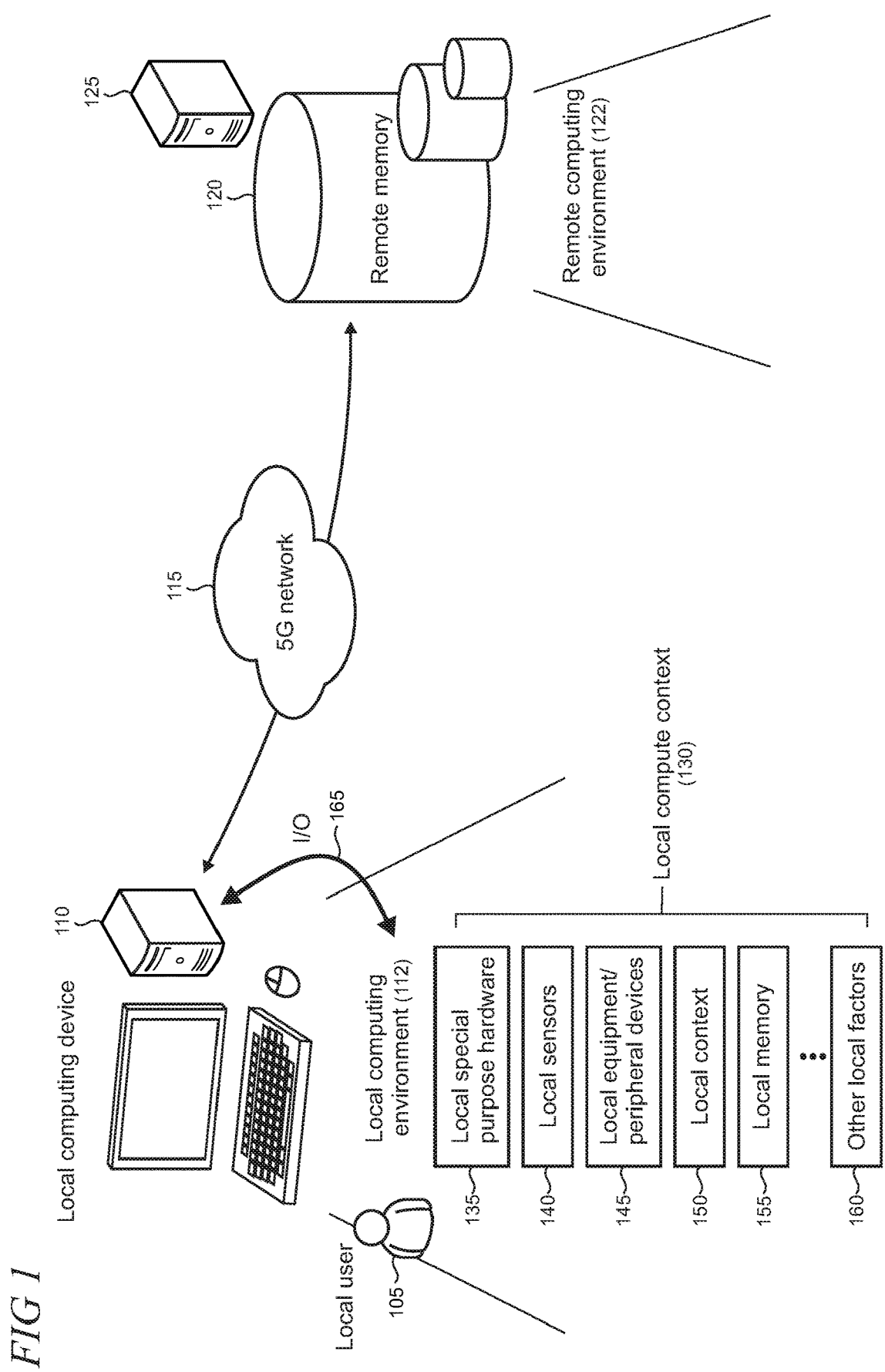
FIG. 1 shows an illustrative arrangement in which a mobile local computing device operating in a local computing environment is configured for communications over a fifth generation (5G) network connection with a remote memory associated with a remote computing device operating in a remote computing environment.

FIG. 1 shows an illustrative arrangement in which a mobile local computing device 110 operating in a local computing environment 112 is configured for communications over a connection to a fifth generation (5G) network 115 with a remote memory 120 associated with a remote computing device 125 operating in a remote computing environment 122. While a 5G network is shown in the drawings and described in the accompanying text below, it is provided for illustrative purposes only and other network protocols that provide high bandwidth and low latency communications capabilities to mobile devices may also be utilized in some cases. In this example, the local computing device is configured with equipment such as monitor, keyboard, and mouse to provide a user interface (UI) to facilitate interactions between the device and a local user 105. It is emphasized that the mobile local computing device shown in FIG. 1 is illustrative, and that a variety of different local computing devices may be utilized to meet the needs of a given implementation of the present RDMA over 5G.

The local computing device itself may be configured as a portable or mobile device, or it may be utilized with conjunction with another system, device, or arrangement that is configured for mobility. In some scenarios, the local computing device may be mobile during some or all operations in a given local computing environment and/or be mobile in between periods of operation. Non-limiting examples of such mobile local computing devices include a self-propelled industrial machine that can traverse an area within a factory, a medical diagnostic device located on a mobile wheeled cart that may be moved to and operated in different parts of a hospital, a wearable device that is worn by a mobile user, and a video surveillance system deployed on an aircraft such as a plane or a drone. In the description that follows, the term "local computing device" is intended to refer to a device having mobility as described above.

The local computing environment 112 can incorporate portions of a physical environment in which the local computing device 110 may operate. The local computing environment 112 may support and/or include a variety of components, data, or factors that collectively provide a local compute context 130 that defines an overall operating environment for the device. The local compute context illustratively includes local special purpose hardware 135 (e.g., graphic processors, audio processors, device controllers, etc.), local sensors 140 (e.g., cameras, microphones, environmental sensors, biometric sensors, etc.), local equipment and/or peripheral devices 145 (e.g., actuators, scientific or industrial equipment, etc.), other local context 150 (user behaviors, social graphs, communications with others, etc.), data that is stored in one or more local memories 155, and other factors 160. Inputs and outputs (I/O) 165 can be exchanged with at least some of the elements in the local compute context in many cases. The user 105 may also be part of the local compute context in typical implementations. The local compute context 130 is unique in that the elements therein are not shared with the remote computing device 125 or the remote computing environment 122. For example, the local special purpose hardware 135 and user 105 are not present in the remote environment.

Figure 2:
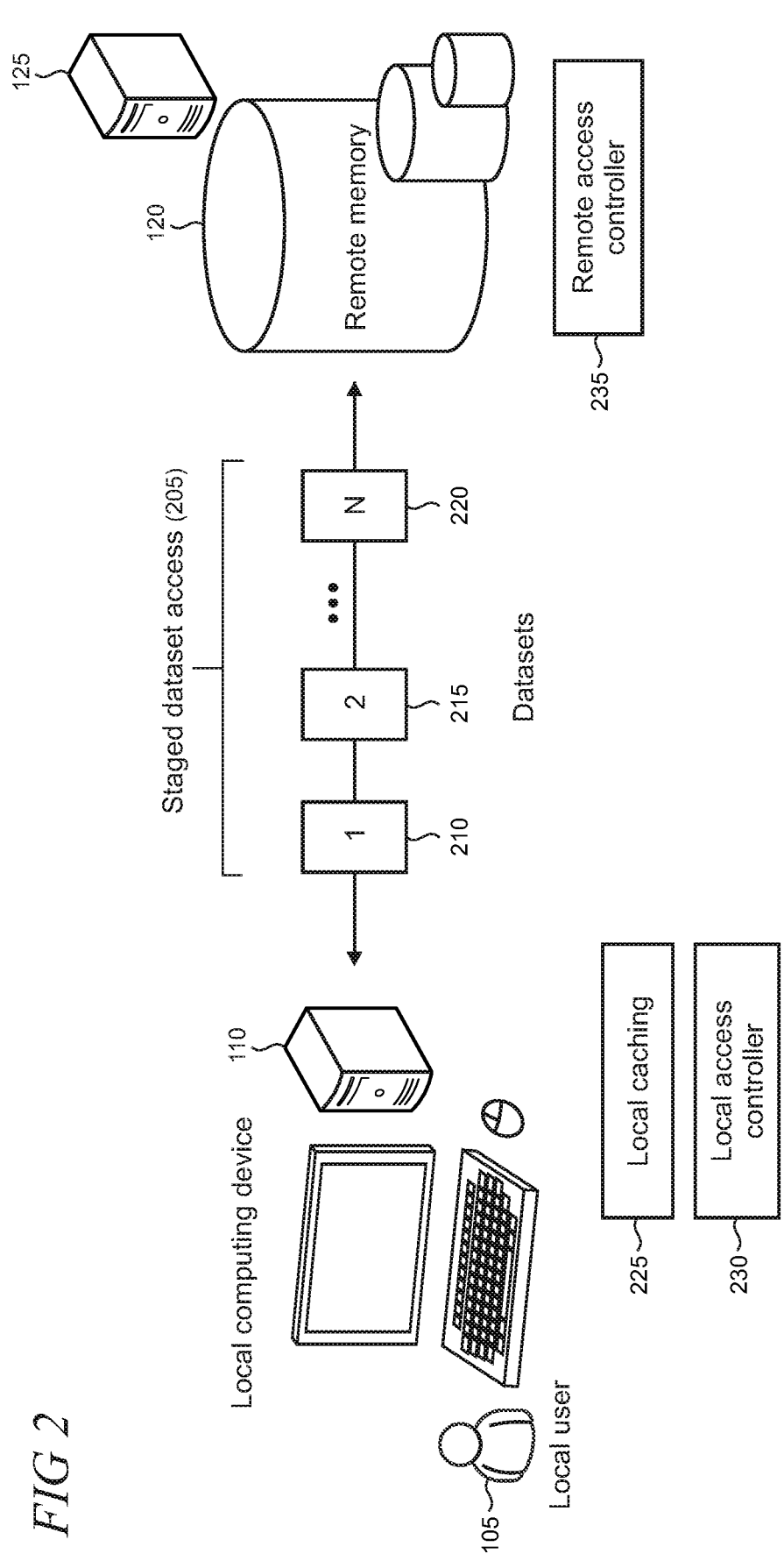
FIG. 2 shows an illustrative embodiment in which datasets stored in remote memory are accessed in stages from a mobile local computing device.

FIG. 2 shows an illustrative embodiment in which datasets stored in remote memory 120 are accessed in stages from a local computing device 110 using RDMA over the 5G network 115 (FIG. 1). Data stored in the remote memory is collected in discrete datasets 210, 215, and 220 in this example. However, the present RDMA over 5G is equally applicable to instances of data of any size. The datasets can be arranged for staged access, as indicated by reference numeral 205. Local caching 225 of remotely accessed data can be utilized in some implementations. Access control to the remote data can be implemented by a local access controller 230, a remote access controller 235, or combinations thereof.

Figure 3:
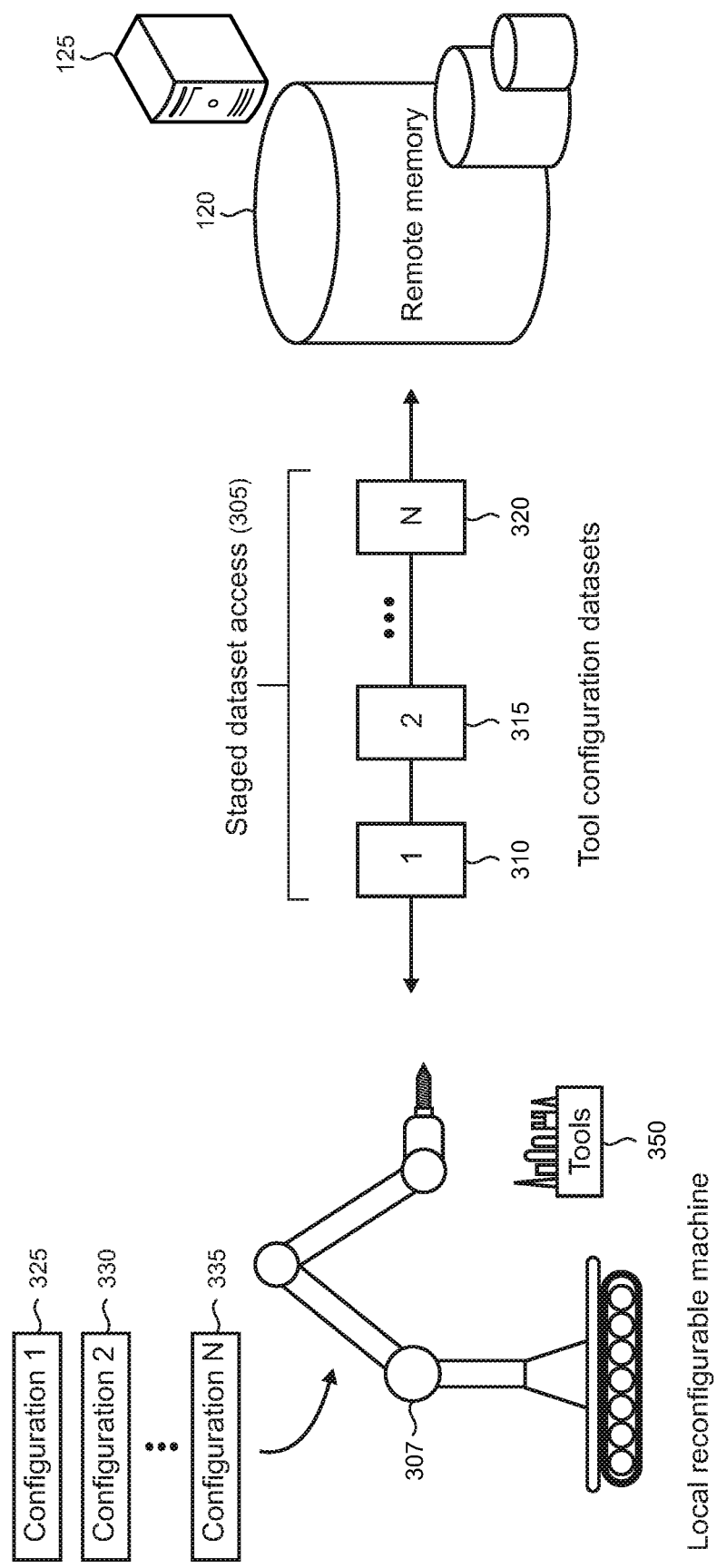
FIG. 3 shows an illustrative embodiment in which a mobile local computing device comprises a machine that is selectively reconfigurable based on datasets that are accessed from a remote memory.

FIG. 3 shows an illustrative embodiment in which a local computing device is selectively reconfigurable based on datasets that are accessed from a remote memory in stages (as indicated by reference numeral 305). In this example, the local computing device is a computerized machine that can take on different configurations 1, 2, . . . N (as indicated respectively by reference numerals 325, 330, and 335) by accessing respective datasets 310, 315, and 320 from the remote memory 120 using RDMA over the 5G network 115 (FIG. 1). In some implementations, the device can include suitable computing capabilities to be utilized on a standalone basis, while in other implementations the device is configured to be operated in combination with other computing devices. For example, the device may implement purpose-specific hardware that is used alongside another local computing device which provides all or part of the needed local processing. As shown in this example, the device 307 may be implemented as a multi-purpose industrial machine having robotic elements that enable multiple different tools 350 to be utilized at different times to enable the machine to perform various operations. For example, the machine can utilize a tool having articulated grippers that are appropriate for picking and placing parts and utilize a different tool having cutting elements that are suitable for another task.

By accessing different datasets using RDMA over the 5G network, the machine 307 is rapidly and selectively configurable. Thus, for example, the datasets may be accessed in a particular sequence to place the machine in an appropriate configuration for the job at hand. In some cases, the datasets may be employed to enable flexible deployment of capabilities across the factory floor, for example, to enable a machine to be reconfigured to replace a machine that is out of service for maintenance or repair. In other cases, the datasets are used sequentially during routine operations in which a given machine performs a variety of different tasks that require different configurations. The datasets can be accessed, for example, to control initialization of the machine to introduce it to a particular local compute context, as well as provide programmatic instructions that may be used during machine operations.

Figure 4:
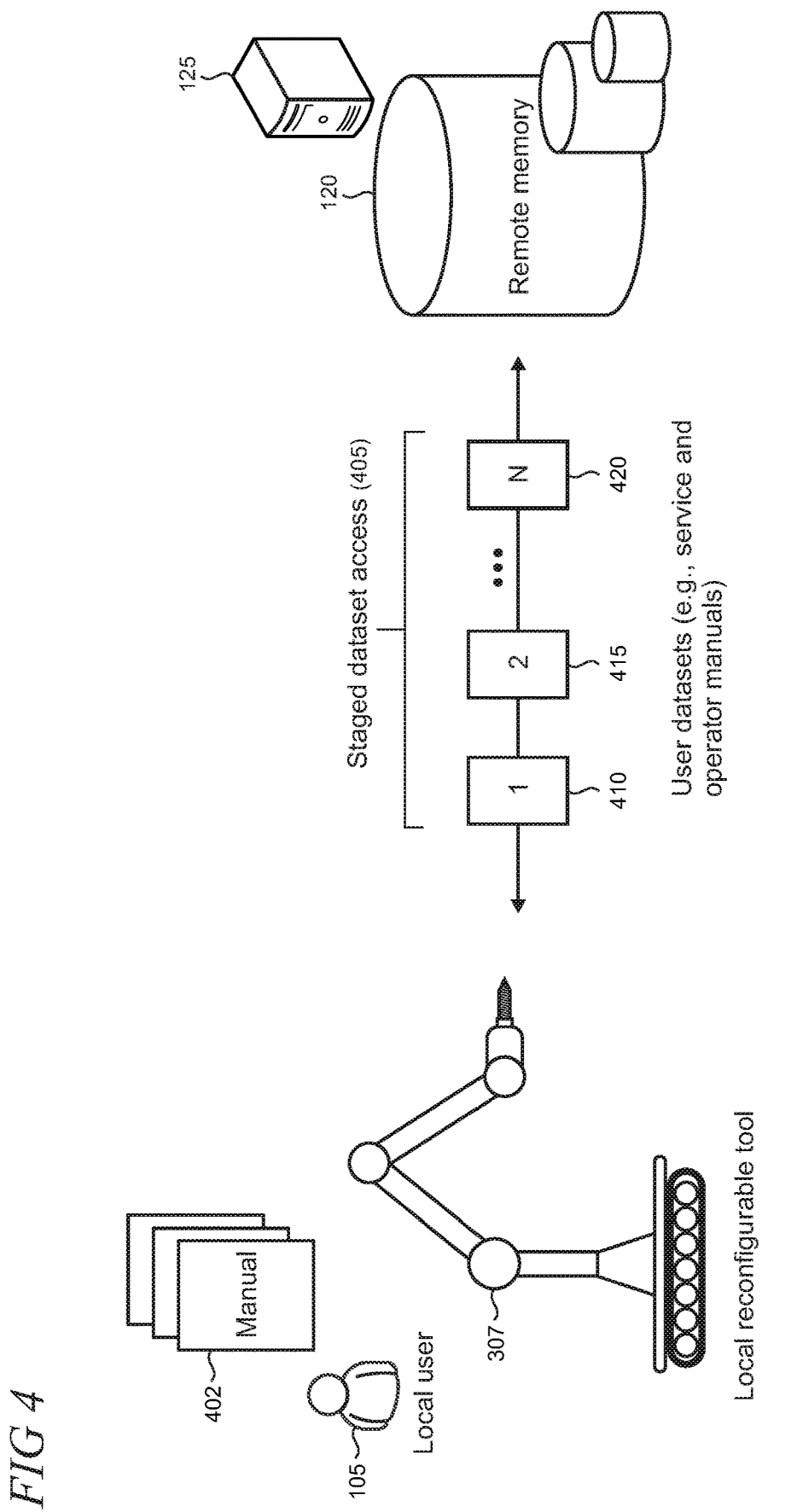
FIG. 4 shows an illustrative embodiment in which user datasets are accessed by a user of a local reconfigurable machine.

In some implementations, as shown in FIG. 4, human-readable information such as user guides, and service, training, maintenance, and/or repair documentation (collectively referred to as "manuals" and indicated by reference numeral 402) can be provided to a user 105 or other human operator or service technician who is associated with the machine. For example, if dataset 310 (FIG. 3) places the machine 307 into a configuration for pick and place operations, corresponding documentation can be accessed by the user 105 using RDMA over the 5G network that enables, for example, troubleshooting of the machine in that configuration in the event of a failure. In some implementations, the manuals can be provided as user datasets 410, 415, and 420 via staged access as indicated by reference numeral 405. Such service, maintenance, and repair documentation can often be lengthy and complex, so archiving the documentation in a centralized remote memory can be expected to be beneficial in some implementations of RDMA over 5G.

Figure 5:
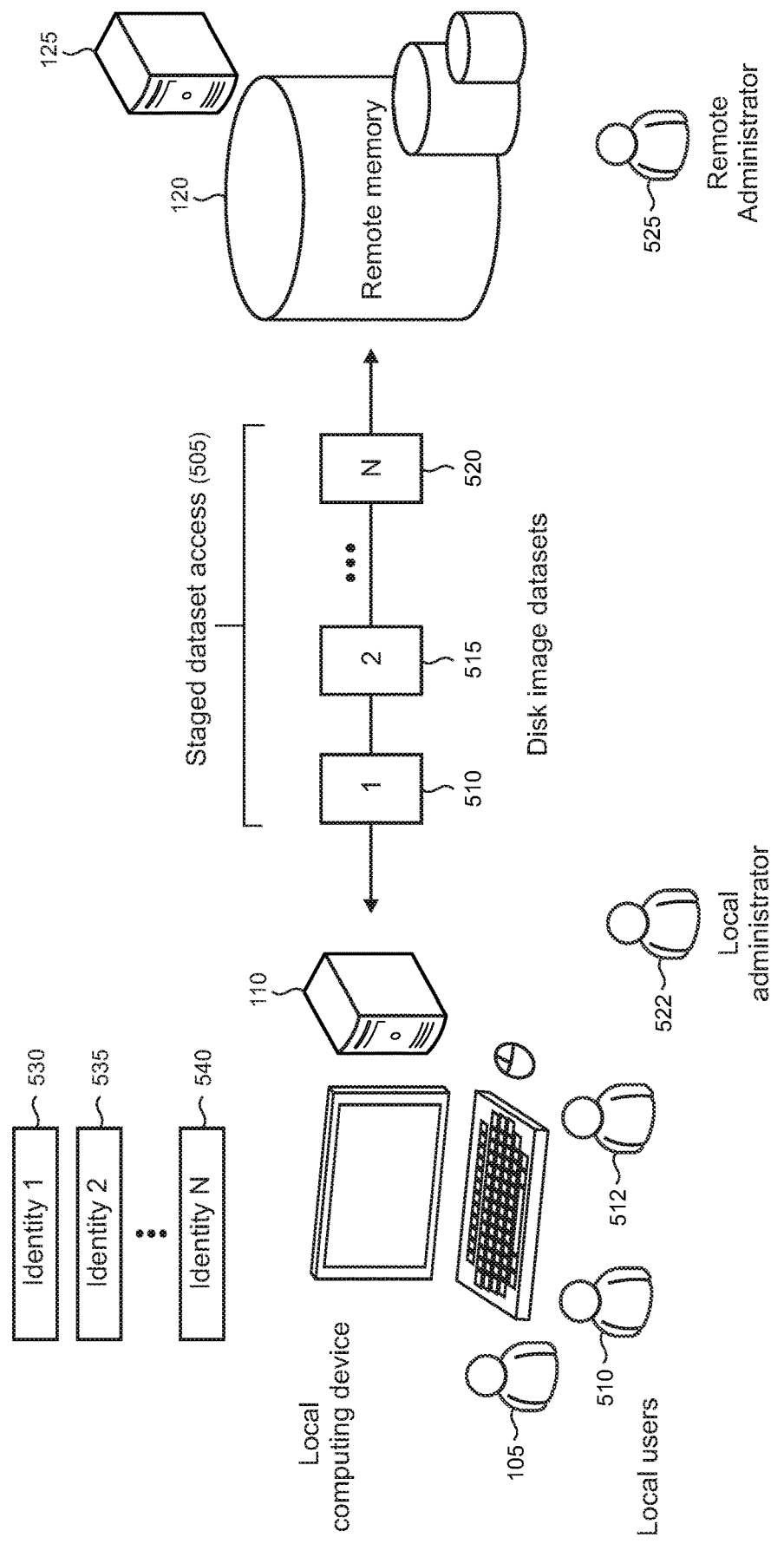
FIG. 5 shows an illustrative embodiment in which a mobile local computing device may be configured with disk images selectively accessed from a remote memory to thereby enable the computing device to be respectively associated with multiple different user identities.

FIG. 5 shows an illustrative embodiment in which a local computing device 110 may be configured with different disk image datasets 510, 515, and 520 that are selectively accessed from a remote memory 120 using RMDA over the 5G network 115 (FIG. 1). The remote access enables the local computing device to be respectively associated with multiple different user identities 530, 535, and 540. The identities are typically associated with different users 105, 510, and 512, although a single user may have multiple different identities in some cases (e.g., an identity associated with work and another different identity associated with school).

In this example, the disk image datasets are each unique to each respective identity. When a given disk image dataset is accessed, the local computing device 110 is placed into a suitable configuration for a corresponding identity. The disk image datasets 510, 515, and 520 can be staged in some implementations, as indicated by reference numeral 505. In some cases, a local or remote administrator 522, 525 can control the staging of disk image datasets to enable the local computing device to be configured to support different user identities. In other cases, the staging can be performed automatically and transparently, for example, when a given user logs in to the local computing device 110

Figure 6:
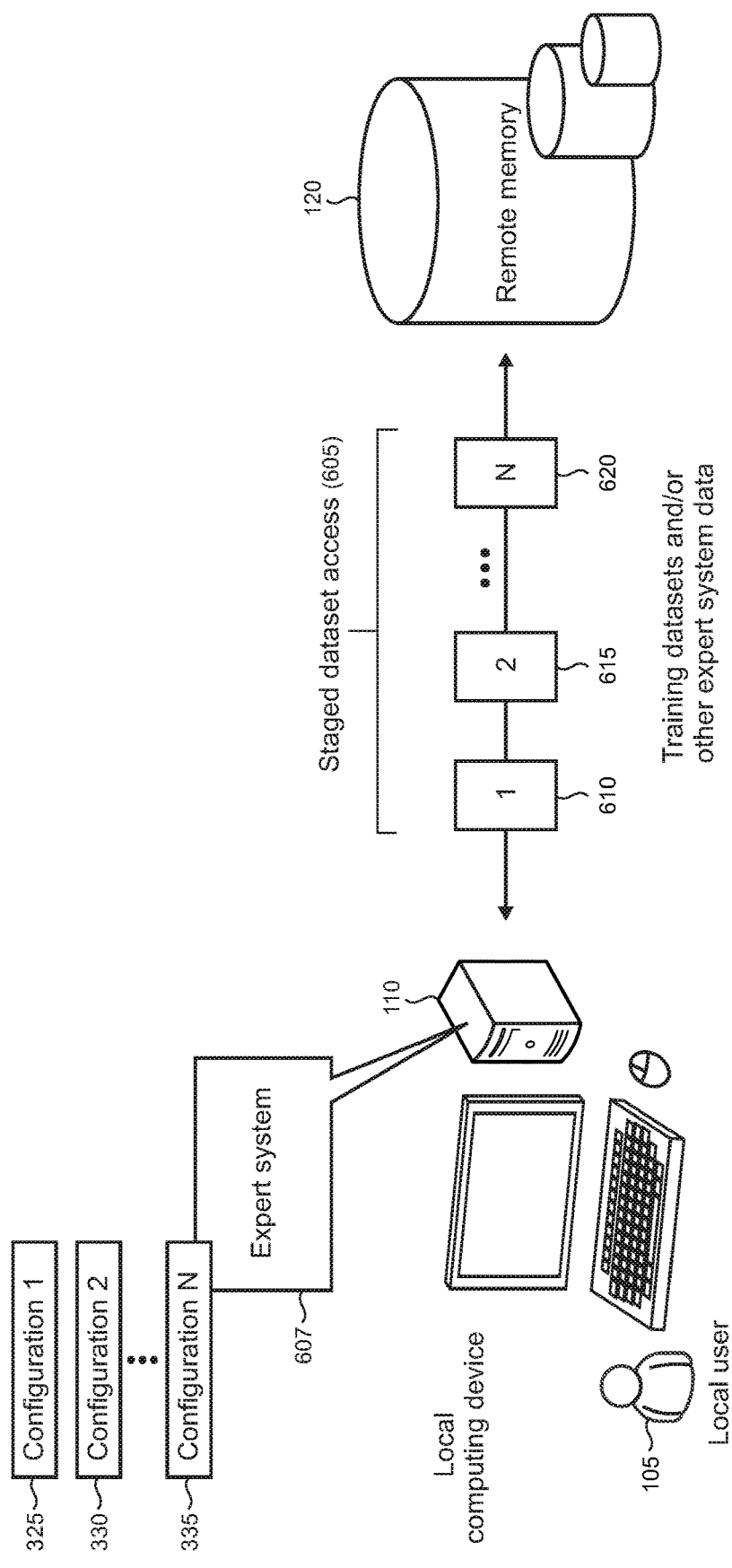
FIG. 6 shows an illustrative embodiment in which a local computing device hosts an expert system that may be selectively reconfigured according to expert system datasets that are accessed from a remote memory.

FIG. 6 shows an illustrative embodiment in which a local computing device 110 hosts an expert system 607 that may be selectively reconfigured according to expert system datasets that are accessed from a remote memory 120 using RDMA over the 5G network 115 (FIG. 1). The expert system can perform local processing using the local compute context and data to provide artificial intelligence services that emulate expert human decision making to local and/or remote users and/or devices. Training datasets or other data that support the expert system can also be accessed from remote memory 120 using RDMA over a 5G network link. Different training datasets 610, 615, and 620 can be accessed in this example to enable the expert system to be trained utilizing different training data to meet a particular expert system application.

Some expert systems can increase performance and accuracy with frequent training to add to their knowledge bases. However, sometimes too much data of the same type or genre can make the system less accurate. Thus, in some implementations, training datasets can be accessed in stages, as indicated by reference numeral 605, so that the expert system is repeatedly trained with different data.

Figure 7:
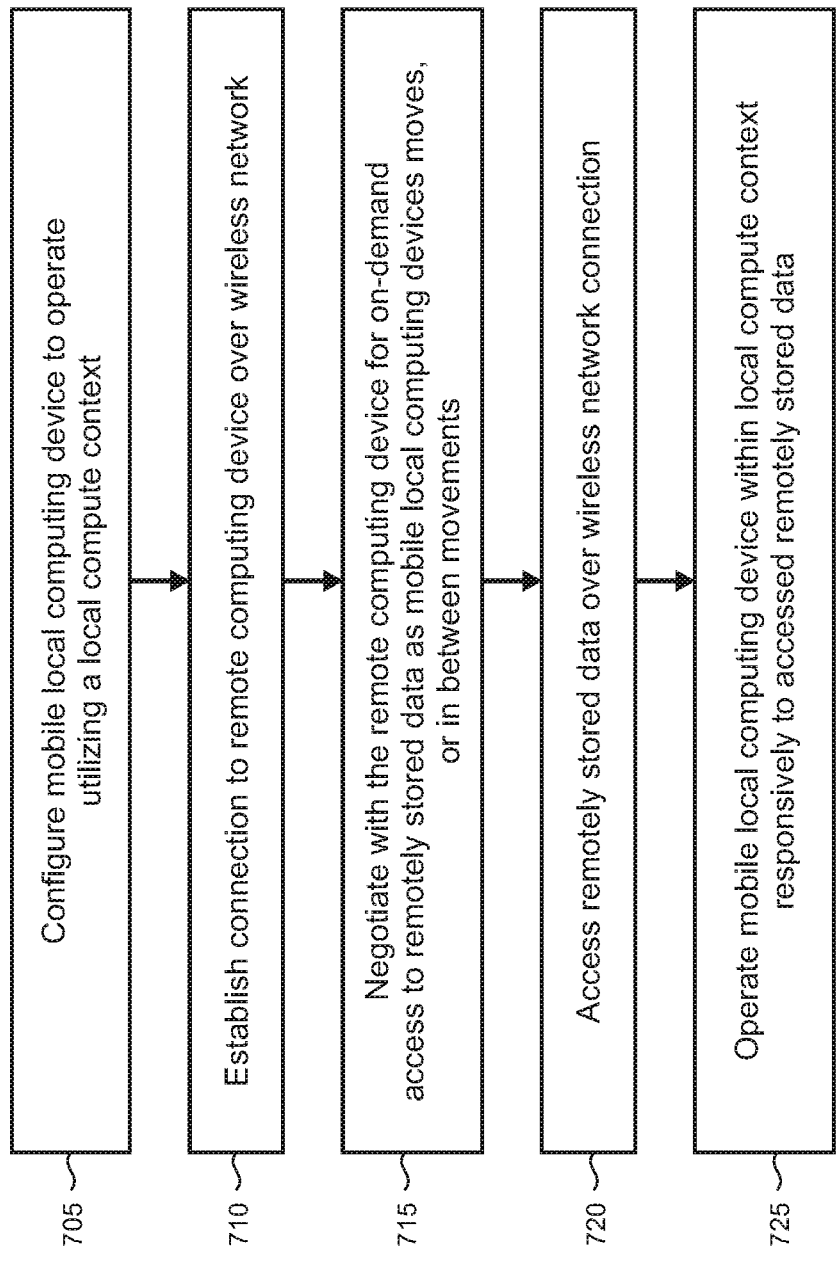
FIGS. 7, 8, and 9 show illustrative methods.

FIG. 7 is a flowchart of an illustrative method 700 that may be implemented by a mobile local computing device 110 (FIG. 1). Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 705, the mobile local computing device is configured to operate utilizing a local compute context in a local computing environment. As described above, the local compute context is defined by a particular combination of contextual elements including, for example components, users, data, or factors that are present in the environment. Typically, the elements are combined in a unique way for each local compute context so that they are different from each other, and different from contexts associated with the remote computing device, memory, and environment. In step 710, the mobile local computing device establishes a connection to the remote computing device over a wireless network. For example, the local computing device may include a wireless network interface configured to facilitate 5G network connectivity or connectivity to another network that provides relatively high bandwidth and low latency.

In step 715, the mobile local and remote computing devices negotiate terms under which the mobile local computing device can access remotely stored data that is stored or otherwise under the control of the remote computing device. For example, the local computing device and/or associated user may need to present access credentials or be authenticated to access data from the remote memory. Quality of service terms for the network connection may also be part of the negotiations in some cases. The access can be implemented as the mobile local computing device moves, or in between such movements. In step 720, the mobile local computing device accesses the remotely stored data over the wireless network connection. In step 725, the mobile local computing device is operated within the local compute context responsively to the accessed remotely stored data.

Figure 8:
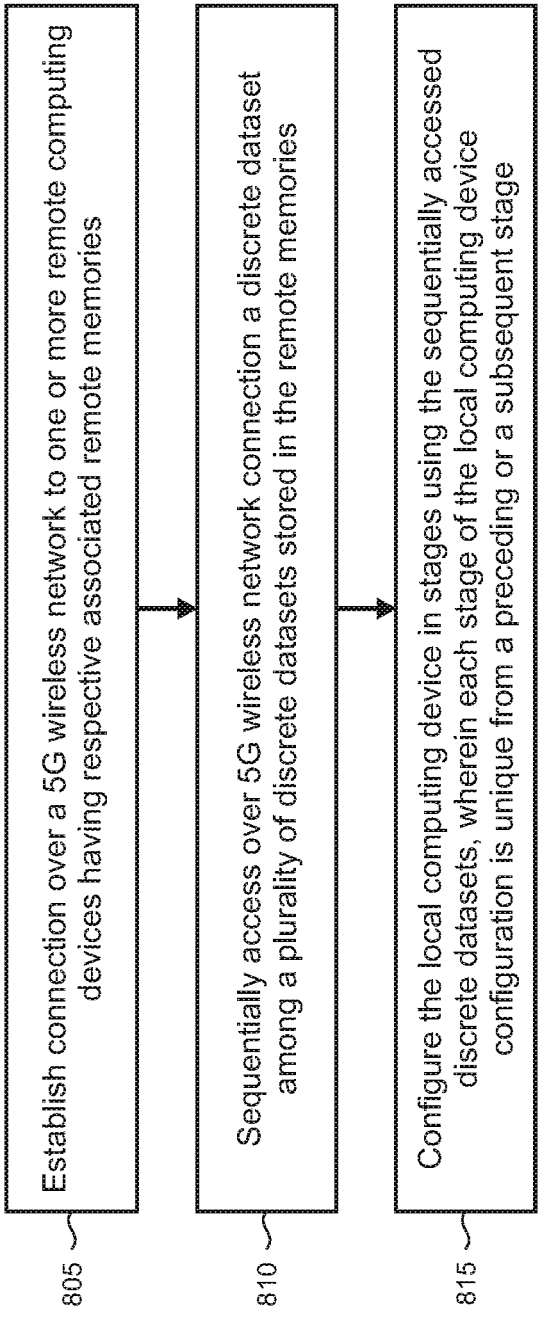

FIG. 8 is a flowchart of an illustrative method 800 that may be implemented by a local computing device 110 (FIG. 1). In step 805, the local computing device establishes a connection over a 5G wireless network to one or more remote computing devices that have respective associated remote memories. In step 810, discrete datasets among a plurality of discrete datasets stored in the remote memories are accessed in a sequence. In step 815, the local computing device is sequentially configured in stages using accessed discrete datasets. The configuration of the local computing device is therefore changed upon each access to each respective discrete dataset. For example, a local computing device may be implemented as a multi-purpose workstation in a factory environment that needs to be particularly configured for each particular job. A first job may require that the workstation interface with or use certain equipment and peripheral devices and implement associated instructions, while a second may require different equipment, devices, and instructions. In another example, the local computing device can expose video editing tools to different users. The device can access different unique discrete datasets to configure it to each respective user. In that way, each user can employ the local computing device to work on their own individual video projects using their own applications and preferences, etc.

Figure 9:
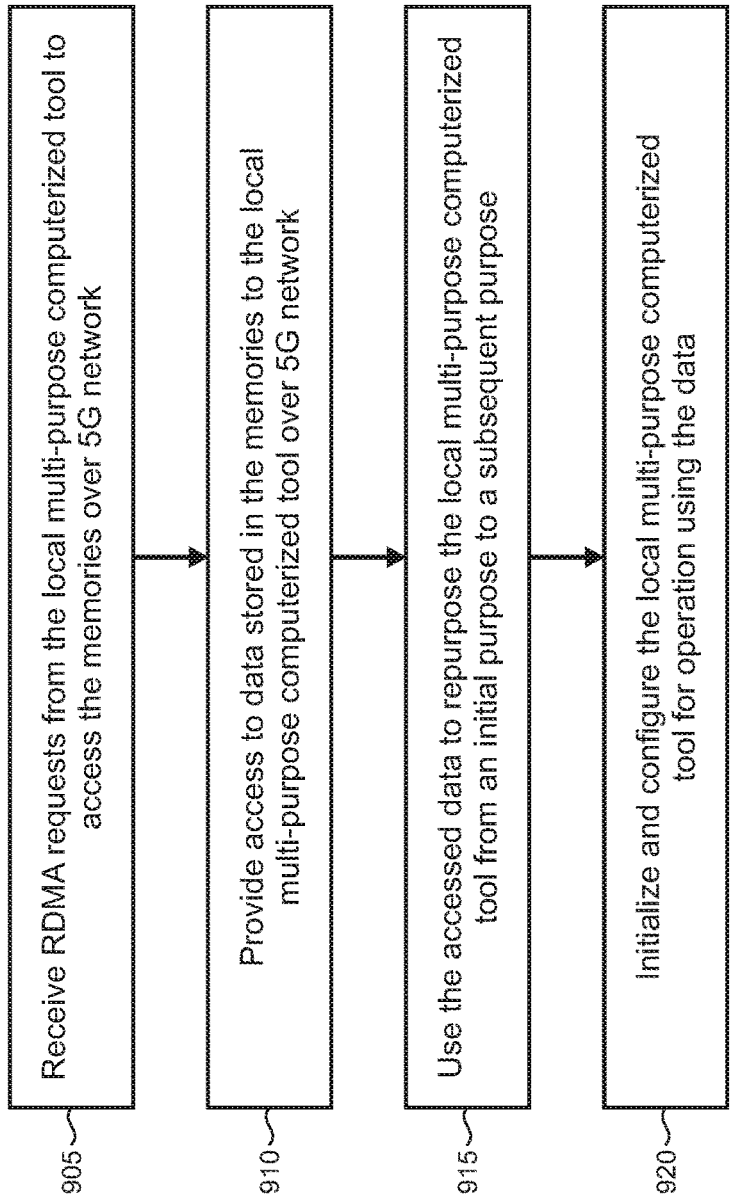

FIG. 9 is a flowchart of an illustrative method 900 that may be implemented by a remote computing device 125 (FIG. 1). In step 905, RDMA requests are received from a local multi-purpose computerized tool over a 5G network. For example, the tool may be implemented as a robotic device or machine. In step 910, the remote computing device provides access over the 5G network to data stored in memories that are associated with the remote computing device. The accessible data may be part of a dataset that may be relatively large. That is, the data communicated between the local tool and remote computing device can be distinguished from thin or sparse data that may be exchanged, for example, to indicate status or state, facilitate 5G network connectivity, or which is part of overhead or administration. Accordingly, the local multi-purpose computerized tool will typically access data that is "non-sparse" and which is characterized by a sufficient quantity and character to drive the business logic instantiated on the tool to thereby enable initialization and configuration changes as needed for a given repurposing. In step 915, the accessed data is utilized to repurpose the local multi-purpose computerized tool from an initial purpose to a subsequent purpose. In step 920, utilization of the data enables the tool to be configured or initialized to a given desired state. The data may also be used to supplement or replace local sources of data. The data can also include information that is related or associated with the computerized tool, for example, service, repair, and maintenance information in human-readable form.

Figure 10:
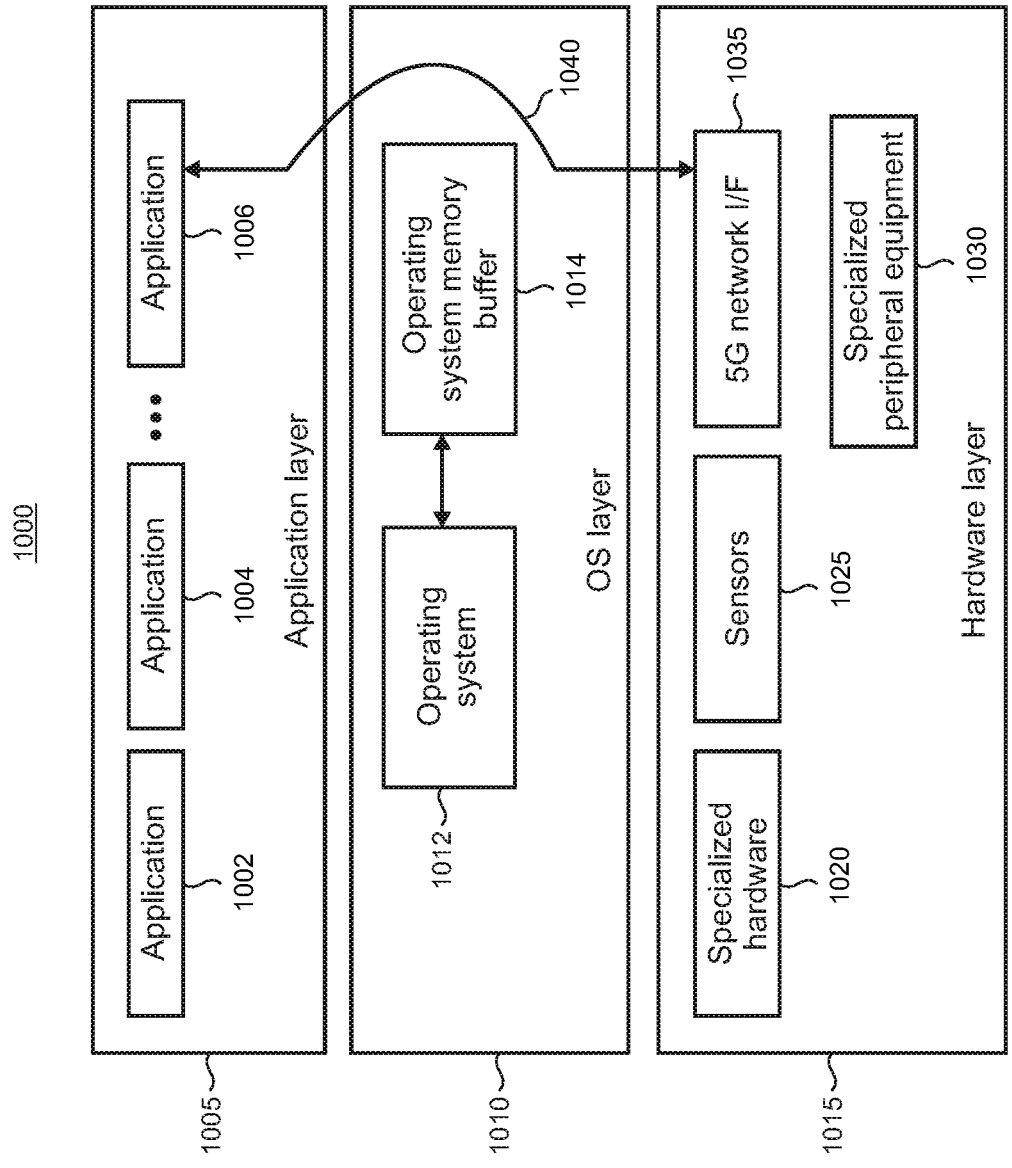
FIG. 10 shows an illustrative layered architecture for a computing device.

FIG. 10 shows an illustrative layered architecture 1000 that may be instantiated on a given device 110 (FIG. 1). The architecture 1000 is typically implemented in software, although combinations of software, firmware, and/or hardware may also be utilized in some cases. The architecture 1000 is arranged in layers and includes an application layer 1005, an operating system (OS) layer 1010, and a hardware layer 1015. The hardware layer 1015 provides an abstraction of the various hardware used by the device 110 (e.g., input and output devices, networking and radio hardware, etc.) to the layers above it. In this illustrative example, the hardware layer supports specialized hardware 1020, sensors 1025, specialized peripheral equipment 1030, and a 5G network interface 1035.

The application layer 1005 supports various applications 1002, 1004, and 1006. The applications can vary by device and implementation. The expert system 607 shown in FIG. 6 and described in the accompanying text is one example of an application. The OS layer 1010 supports an operating system 1012 and an associated memory buffer 1014. Other components (not shown) may also be instantiated in the OS layer depending on the needs of a particular computing device implementation. Using RDMA, an application 1006 can directly interoperate with the 5G network interface 1035 while bypassing the operating system memory buffer 1014 and other OS components, as indicated by line 1040.

Figure 11:
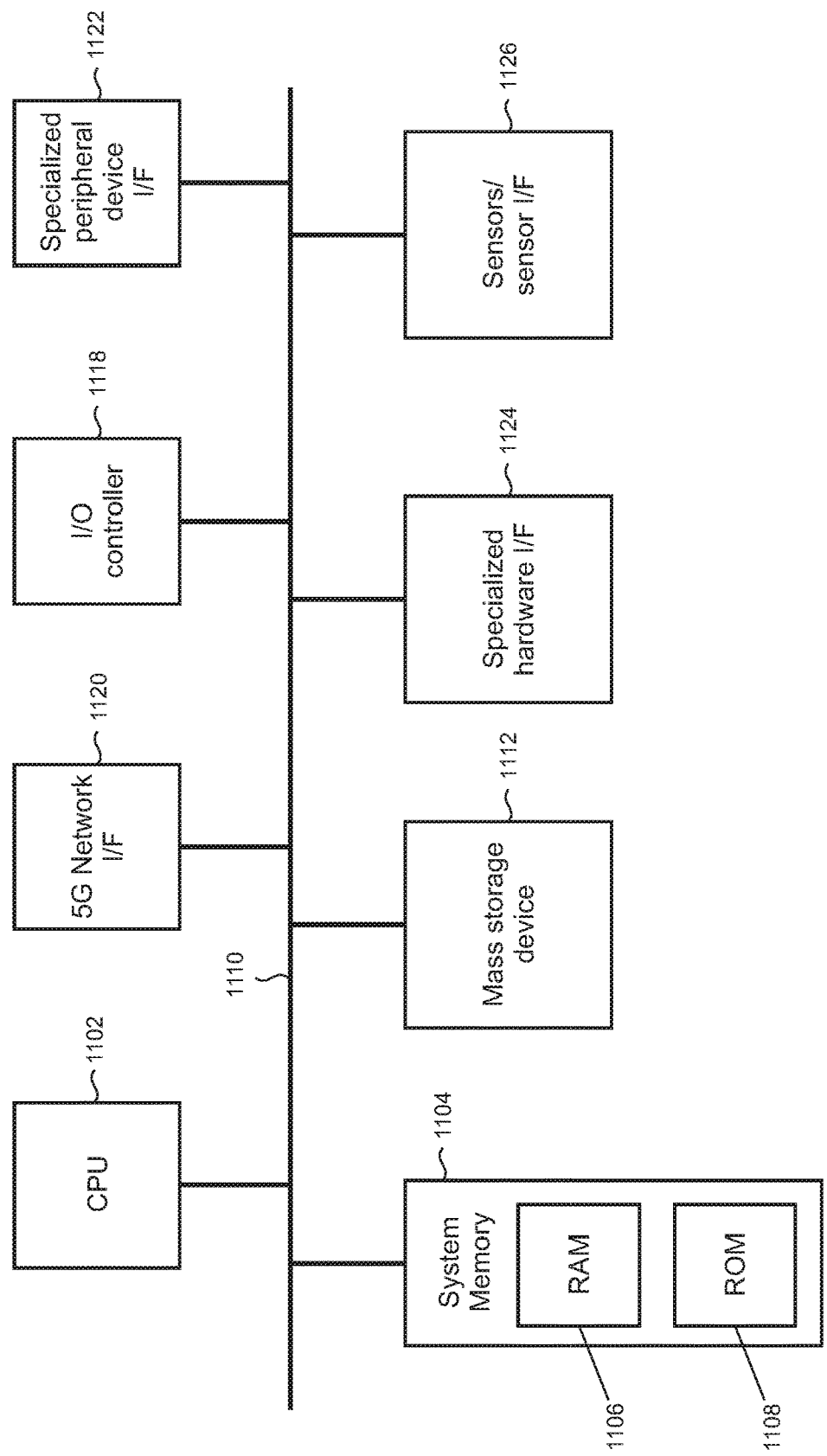
FIG. 11 is a simplified block diagram of an illustrative computer system such as a personal computer (PC) or server that may be used in part to implement the present remote direct memory access over 5G.

FIG. 11 shows an illustrative architecture 1100 for a device capable of executing the various components described herein for providing the present RDMA over 5G. Thus, the architecture 1100 illustrated in FIG. 11 shows an architecture that may be adapted for a server computer, mobile phone, a PDA, a smartphone, a desktop computer, a netbook computer, a tablet computer, GPS device, gaming console, an industrial machine, a robot, a computerized tool, and/or a laptop computer. The architecture 1100 may be utilized to execute any aspect of the components presented herein. The architecture 1100 may be implemented using hardware, software, or firmware, or combinations thereof.

The architecture 1100 illustrated in FIG. 11 includes a CPU (Central Processing Unit) 1102, a primary system memory 1104, including a RAM 1106 and a ROM 1108, and a system bus 1110 that couples the memory 1104 to the CPU 1102. A basic input/output system containing the basic routines that help to transfer information between elements within the architecture 1100, such as during startup, is stored in the ROM 1108. The architecture 1100 further includes a mass storage device 1112 for storing software code or other computer-executed code that is utilized to implement applications, the file system, and the operating system.

The mass storage device 1112 is connected to the CPU 1102 through a mass storage controller (not shown) connected to the bus 1110. The mass storage device 1112 and its associated computer-readable storage media provide non-volatile (NV) secondary or persistent storage for the architecture 1100. A 5G network interface 1120 is connected to the CPU through the bus 1110. A specialized peripheral device interface 1122 is connected to the CPU through the bus 1110. A specialized hardware interface 1124 is connected to the CPU through the bus 1110. Sensors and/or sensor interfaces (collectively identified by reference numeral 1126) are also connected to the CPU through the bus 1110. The various interfaces can enable a local computing device that implements the architecture 1100 to interoperate with a given local compute context.

Although the description of computer-readable storage media contained herein refers to a mass storage device, such as a hard disk or CD-ROM drive, it may be appreciated by those skilled in the art that computer-readable storage media can be any available storage media that can be accessed by the architecture 1100.

By way of example, and not limitation, computer-readable storage media may include removable and non-removable media implemented in any method or technology for secondary or persistent storage of information such as computer-readable instructions, data structures, program modules, or other data. For example, computer-readable media includes, but is not limited to, NV RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1100.

According to various embodiments, the architecture 1100 may operate in a networked environment using logical connections to remote computers through a network. The architecture 1100 may connect to the network through a network interface unit 1120 connected to the bus 1110. It may be appreciated that the network interface unit 1120 also may be utilized to connect to other types of networks and remote computer systems. The architecture 1100 also may include an input/output controller 1118 for receiving and processing input from a number of other devices, including a keyboard, mouse, or electronic stylus (not shown in FIG. 11). Similarly, the input/output controller 1118 may provide output to a display screen, a printer, or other type of output device (also not shown in FIG. 11).

It may be appreciated that the software components described herein may, when loaded into the CPU 1102 and executed, transform the CPU 1102 and the overall architecture 1100 from a general-purpose computing system into a special-purpose computing system customized to facilitate the functionality presented herein. The CPU 1102 may be constructed from any number of transistors or other discrete circuit elements, which may individually or collectively assume any number of states. More specifically, the CPU 1102 may operate as a finite-state machine, in response to executable instructions contained within the software modules disclosed herein. These computer-executable instructions may transform the CPU 1102 by specifying how the CPU 1102 transitions between states, thereby transforming the transistors or other discrete hardware elements constituting the CPU 1102.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1100 in order to store and execute the software components presented herein. It also may be appreciated that the architecture 1100 may include other types of computing devices, including handheld computers, embedded computer systems, smartphones, PDAs, and other types of computing devices known to those skilled in the art. It is also contemplated that the architecture 1100 may not include all of the components shown in FIG. 11, may include other components that are not explicitly shown in FIG. 11, or may utilize an architecture completely different from that shown in FIG. 11.

Figure 12:
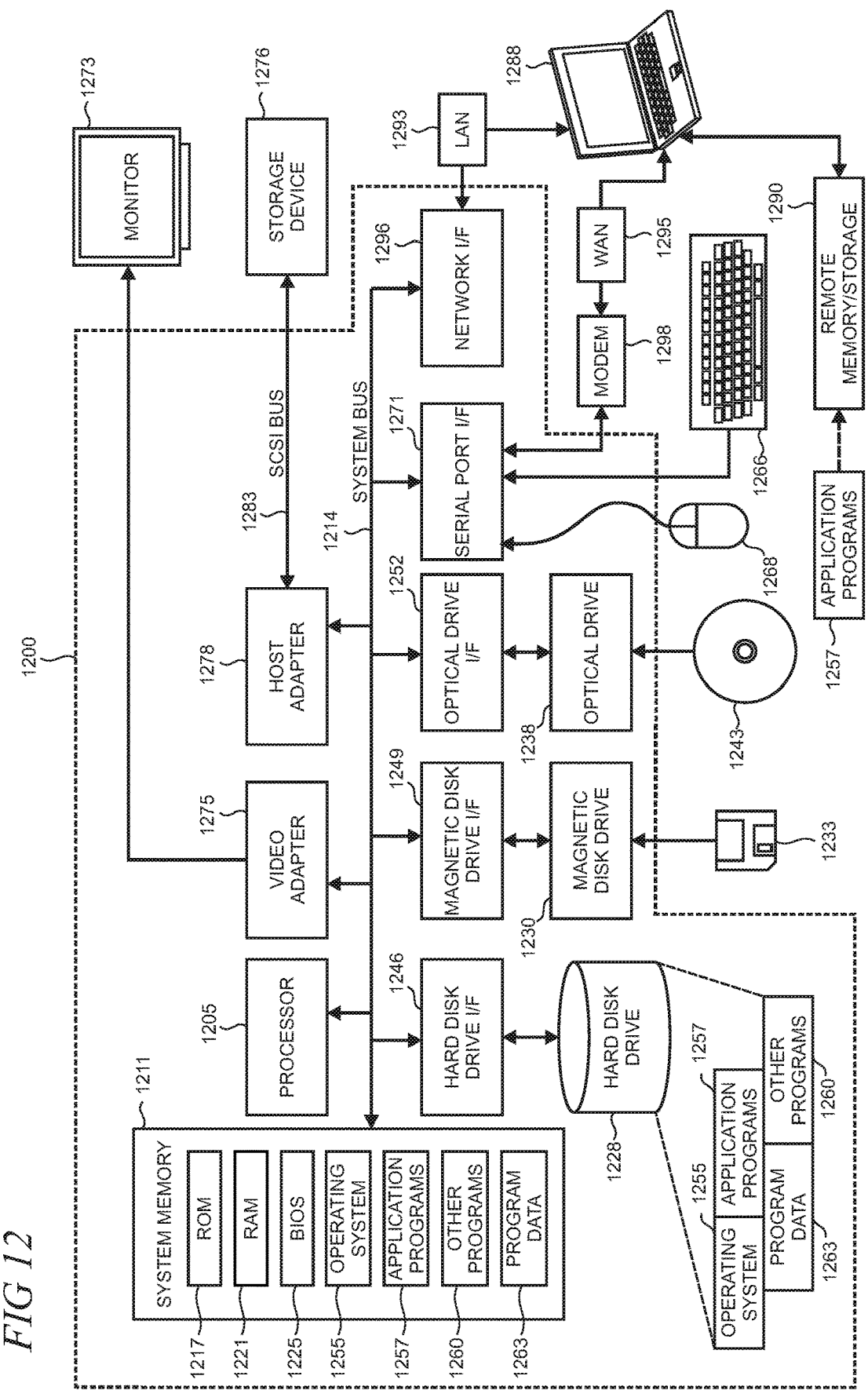
FIG. 12 shows a block diagram of an illustrative device that may be used in part to implement the present remote direct memory access over 5G.

FIG. 12 is a simplified block diagram of an illustrative computer system 1200 such as a PC, client machine, or server with which the present RDMA over 5G may be implemented. Computer system 1200 includes a processor 1205, a system memory 1211, and a system bus 1214 that couples various system components including the system memory 1211 to the processor 1205. The system bus 1214 may be any of several types of bus structures including a memory bus or memory controller, a peripheral bus, or a local bus using any of a variety of bus architectures. The system memory 1211 includes read only memory (ROM) 1217 and random access memory (RAM) 1221. A basic input/output system (BIOS) 1225, containing the basic routines that help to transfer information between elements within the computer system 1200, such as during startup, is stored in ROM 1217. The computer system 1200 may further include a hard disk drive 1228 for reading from and writing to an internally disposed hard disk (not shown), a magnetic disk drive 1230 for reading from or writing to a removable magnetic disk 1233 (e.g., a floppy disk), and an optical disk drive 1238 for reading from or writing to a removable optical disk 1243 such as a CD (compact disc), DVD (digital versatile disc), or other optical media. The hard disk drive 1228, magnetic disk drive 1230, and optical disk drive 1238 are connected to the system bus 1214 by a hard disk drive interface 1246, a magnetic disk drive interface 1249, and an optical drive interface 1252, respectively. The drives and their associated computer-readable storage media provide non-volatile storage of computer-readable instructions, data structures, program modules, and other data for the computer system 1200. Although this illustrative example includes a hard disk, a removable magnetic disk 1233, and a removable optical disk 1243, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present RDMA over 5G. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, refer to non-transitory embodiments, and do not include waves, signals, and/or other transitory and/or intangible communication media.

A number of program modules may be stored on the hard disk, magnetic disk 1233, optical disk 1243, ROM 1217, or RAM 1221, including an operating system 1255, one or more application programs 1257, other program modules 1260, and program data 1263. A user may enter commands and information into the computer system 1200 through input devices such as a keyboard 1266 and pointing device 1268 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1205 through a serial port interface 1271 that is coupled to the system bus 1214, but may be connected by other interfaces, such as a parallel port, game port, or universal serial bus (USB). A monitor 1273 or other type of display device is also connected to the system bus 1214 via an interface, such as a video adapter 1275. In addition to the monitor 1273, personal computers typically include other peripheral output devices (not shown), such as speakers and printers. The illustrative example shown in FIG. 12 also includes a host adapter 1278, a Small Computer System Interface (SCSI) bus 1283, and an external storage device 1276 connected to the SCSI bus 1283.

The computer system 1200 is operable in a networked environment using logical connections to one or more remote computers, such as a remote computer 1288. The remote computer 1288 may be selected as another personal computer, a server, a router, a network PC, a peer device, or other common network node, and typically includes many or all of the elements described above relative to the computer system 1200, although only a single representative remote memory/storage device 1290 is shown in FIG. 12. The logical connections depicted in FIG. 12 include a local area network (LAN) 1293 and a wide area network (WAN) 1295 such as a 5G network. Such networking environments are often deployed, for example, in offices, enterprise-wide computer networks, intranets, and the Internet.

When used in a LAN networking environment, the computer system 1200 is connected to the local area network 1293 through a network interface or adapter 1296 which may be implemented using a 5G network interface in a similar manner to that shown by element 1035 in FIG. 10. When used in a WAN networking environment, the computer system 1200 typically includes a broadband modem 1298, network gateway, or other means for establishing communications over the wide area network 1295, such as the Internet. The broadband modem 1298, which may be internal or external, is connected to the system bus 1214 via a serial port interface 1271. In a networked environment, program modules related to the computer system 1200, or portions thereof, may be stored in the remote memory storage device 1290. It is noted that the network connections shown in FIG. 12 are illustrative and other means of establishing a communications link between the computers may be used depending on the specific requirements of an application of the present RDMA over 5G.

Various exemplary embodiments of the present mobile remote direct memory access over 5G are now presented by way of illustration and not as an exhaustive list of all embodiments. An example includes a method for using a connection over a wireless network for accessing data from a mobile local computing device in a local computing environment using remote direct memory access (RDMA) to a remote computing device in a remote computing environment, comprising: configuring the mobile local computing device to operate utilizing a local compute context that is based on one or more factors that are unique to the local computing environment and unavailable to the remote computing device in the remote computing environment; establishing the connection to the remote computing device over the wireless network; negotiating with the remote computing device for on-demand access to remote data that is stored therein, or which is controlled by the remote computing device, in which the remote data is accessed as the mobile local computing device moves within the local computing environment or is accessed in between movements of the mobile local computing device within the local computing environment; and operating the mobile local computing device within the local compute context responsively to accessed remote data.

In another example, the method further comprises accessing remote data in discrete datasets, wherein the datasets are accessed in stages so that a configuration of the mobile local computing device is selectively changed in stages based on the respective discrete datasets. In another example, the method further comprises monitoring changes that occur in the local compute context and accessing a particular discrete dataset in response to the monitoring. In another example, the method further comprises accessing the discrete dataset to reconfigure operations of the mobile local computing device in real time. In another example, the method further includes accessing the discrete dataset to provide instructions in human-readable form that are associated with the reconfigured operations. In another example, the method further includes controlling a configuration of the mobile local computing device using a predetermined sequence, in which the configuration of the mobile local computing device is determined by a discrete dataset, and a series of discrete remote datasets are accessed using RDMA over the wireless network connection using the predetermined sequence. In another example, the local compute context is established by one or more of sensors that operate within the local computing environment, peripheral equipment that operates within the local computing environment, or specialized hardware that operates within the local computing environment. In another example, the wireless network comprises a fifth generation (5G) wireless network.

A further example includes one or more non-transitory computer-readable storage devices storing instructions thereon which, when executed by one or more processors disposed in a local computing device cause the local computing device to: establish a connection over a fifth generation (5G) wireless network to one or more remote computing devices to which one or more remote memories are respectively associated; sequentially access over the 5G wireless network connection a discrete dataset among a plurality of discrete datasets stored in the remote memories; configure the local computing device in stages using the sequentially accessed discrete datasets, wherein each stage of the local computing device configuration is unique from a preceding or a subsequent stage.

In another example, the access is performed in accordance with remote direct memory access (RDMA) protocols in which an application stored in the storage device executes to directly interoperate with a 5G network interface in the local computing device to thereby communicate with the remote memories while bypassing memory associated with an operating system that executes on the local computing device. In another example, the application is an expert system and the discrete datasets comprise training datasets. In another example, each unique local computing device is responsive to a different local compute context, each different local compute context being defined by I/O (inputs/outputs) to one of local sensors, local hardware, or local peripheral equipment. In another example, the sequence of stages is predetermined so that the local computing device is respectively configured for an operation that is performed in stages, wherein each operation stage is supported by a specific unique configuration for the local computing device. In another example, the local computing device includes multi-purpose robotic elements that are sequentially controllable in stages according to specific unique configurations in the respective discrete datasets.

A further example includes a computing device configured for operations which are remote from a local multi-purpose computerized tool, comprising: one or more processors; an interface to a fifth generation (5G) network; one or more non-transitory computer-readable memories configured for remote direct memory access (RDMA) from a local multi-purpose computerized tool, and further configured to store instructions which, when executed by the one or more processors, cause the remote computing device to: receive RDMA requests from the local multi-purpose computerized tool to access the memories over the 5G network, provide access to data stored in the memories to the local multi-purpose computerized tool over the 5G network, wherein the provided data repurposes the local multi-purpose computerized tool from an initial purpose to a subsequent purpose, and wherein the local multi-purpose computerized tool is initialized and configured for operation using the non-sparse data.

In another example, the multi-purpose computerized tool is a multi-purpose robotic tool comprising at least one actuator. In another example, the provided data is non-sparse data. In another example, the non-sparse data comprises discrete datasets that are provided to the local multi-purpose tool in a predetermined sequence to selectively repurpose the local multi-purpose tool to be initialized and operated to perform a task according to the predetermined sequence. In another example, the instructions further cause the computing device to update the non-sparse data prior to providing access to the multi-purpose computerized tool. In another example, the local multi-purpose computerized tool performs local caching of the non-sparse data.

Based on the foregoing, it may be appreciated that technologies for RDMA over 5G have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and is not be construed as limiting. Various modifications and changes may be made to the subject matter described herein without following the example embodiments and applications illustrated and described, and without departing from the true spirit and scope of the present invention, which is set forth in the following claims.

What is claimed:

1. A method for using a connection over a fifth generation (5G) wireless network for accessing data from a mobile local computing device in a local computing environment using remote direct memory access (RDMA) to a remote computing device in a remote computing environment, comprising:

configuring the mobile local computing device to operate utilizing a local compute context that is based on one or more factors that are unique to the local computing environment and which are unavailable to the remote computing device in the remote computing environment;

using capabilities of the 5G wireless network to establish a low latency connection to the remote computing device to thereby enable real time remote data access using RDMA;

negotiating with the remote computing device for access to remote data that is stored therein, or which is controlled by the remote computing device, in which the remote data is accessed in real time using RDMA as the mobile local computing device moves within the local computing environment or is accessed in between movements of the mobile local computing device within the local computing environment; and dynamically modifying a configuration of the mobile local computing device using the remote data access using RDMA in real time responsively to real time changes in one or more of the factors on which the local compute context for the mobile local computing device is based.

2. The method of claim 1 further comprising accessing remote data in discrete datasets, wherein the datasets are accessed in stages so that a configuration of the mobile local computing device is selectively changed in stages based on the respective discrete datasets.

3. The method of claim 2 further comprising monitoring changes that occur in the local compute context and accessing a particular discrete dataset in response to the monitoring.

4. The method of claim 3 further including accessing the discrete dataset to provide instructions in human-readable form that are associated with the modified configuration.

5. The method of claim 1 further including controlling a configuration of the mobile local computing device using a predetermined sequence, in which the configuration of the mobile local computing device is determined by a discrete dataset, and a series of discrete remote datasets are accessed using RDMA over the wireless network connection using the predetermined sequence.

6. The method of claim 1 in which the local compute context is established by one or more of sensors that operate within the local computing environment, peripheral equipment that operates within the local computing environment, or specialized hardware that operates within the local computing environment.

7. One or more non-transitory computer-readable storage devices storing instructions thereon which, when executed by one or more processors disposed in a local computing device cause the local computing device to:

establish a connection over a fifth generation (5G) wireless network to one or more remote computing devices to which one or more remote memories are respectively associated;

sequentially access over the 5G wireless network connection discrete datasets among a plurality of discrete datasets stored in the remote memories;

configure the local computing device in stages using the sequentially accessed discrete datasets, wherein each stage of the local computing device configuration is unique from a preceding or a subsequent stage.

8. The one or more non-transitory computer-readable storage devices of claim 7 in which the access is performed in accordance with remote direct memory access (RDMA)

protocols in which an application stored in the one or more non-transitory computer-readable storage devices executes to directly interoperate with a 5G network interface in the local computing device to thereby communicate with the remote memories while bypassing memory associated with an operating system that executes on the local computing device.

9. The one or more non-transitory computer-readable storage devices of claim 8 in which the application is an expert system and the discrete datasets comprise training datasets.

10. The one or more non-transitory computer-readable storage devices of claim 8 in which each local computing device among a plurality of local computing devices is responsive to a different local compute context, each different local compute context being defined by I/O (inputs/outputs) to one of local sensors, local hardware, or local peripheral equipment.

11. The one or more non-transitory computer-readable storage devices of claim 8 in which the sequence of stages is predetermined so that the local computing device is respectively configured for an operation that is performed in stages, wherein each operation stage is supported by a specific unique configuration for the local computing device.

12. The one or more non-transitory computer-readable storage devices of claim 11 in which the local computing device includes multi-purpose robotic elements that are sequentially controllable in stages according to specific unique configurations in the respective discrete datasets.

13. A computing device configured for operations which are remote from a local multi-purpose computerized tool, comprising:
one or more processors;
an interface to a fifth generation (5G) network;
one or more non-transitory computer-readable memories configured for remote direct memory access (RDMA) from a local multi-purpose computerized tool, and further configured to store instructions which, when executed by the one or more processors, cause the remote computing device to:
receive RDMA requests from the local multi-purpose computerized tool to access the memories over the 5G network,
provide access to data stored in the memories to the local multi-purpose computerized tool over the 5G network,
wherein the provided data repurposes the local multi-purpose computerized tool from an initial purpose to a subsequent purpose, and
wherein the local multi-purpose computerized tool is initialized and configured for operation using the provided data.

14. The computing device of claim 13 in which the multi-purpose computerized tool is a multi-purpose robotic tool comprising at least one actuator.

15. The computing device of claim 13 in which the provided data is non-sparse data.

16. The computing device of claim 15 in which the non-sparse data comprises discrete datasets that are provided to the local multi-purpose computerized tool in a predetermined sequence to selectively repurpose the local multi-purpose computerized tool to be initialized and operated to perform a task according to the predetermined sequence.

17. The computing device of claim 15 in which the instructions further cause the computing device to update the non-sparse data prior to providing access to the multi-purpose computerized tool.

18. The computing device of claim 15 in which the local multi-purpose computerized tool performs local caching of the non-sparse data.

* * * * *